United States Patent
Xue et al.

(10) Patent No.: US 11,664,743 B2
(45) Date of Patent: May 30, 2023

(54) SYSTEM AND METHOD OF INVERTER CONTROL

(71) Applicant: UT-Battelle, LLC, Oak Ridge, TN (US)

(72) Inventors: Lingxiao Xue, Oak Ridge, TN (US); Gui-Jia Su, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/400,169

(22) Filed: Aug. 12, 2021

(65) Prior Publication Data

US 2022/0052626 A1 Feb. 17, 2022

Related U.S. Application Data (60) Provisional application No. 63/065,670, filed on Aug. 14, 2020.

(51) Int. Cl.
*H02P 27/08* (2006.01)
*H02M 7/5395* (2006.01)
*H02M 7/5387* (2007.01)
*H02P 5/74* (2006.01)

(52) U.S. Cl.
CPC ....... *H02M 7/5395* (2013.01); *H02M 7/5387* (2013.01); *H02P 5/74* (2013.01); *H02P 27/08* (2013.01)

(58) Field of Classification Search
CPC ..... H02M 7/5395; H02M 7/5387; H02P 5/74; H02P 27/08
See application file for complete search history.

(56) References Cited

U.S. PATENT DOCUMENTS

| | | | | |
|---|---|---|---|---|
| 5,341,075 A | * | 8/1994 | Cocconi | B60L 53/20 307/66 |
| 6,864,646 B2 | | 3/2005 | Rahman et al. | |
| 8,373,372 B2 | | 2/2013 | Su | |
| 9,515,484 B2 | | 12/2016 | Huang et al. | |
| 2003/0107352 A1 | * | 6/2003 | Downer | B60L 58/20 322/40 |
| 2009/0033156 A1 | * | 2/2009 | Chakrabarti | H02P 4/00 307/43 |
| 2010/0026217 A1 | * | 2/2010 | Yoshida | H02P 27/04 318/400.3 |
| 2010/0071970 A1 | * | 3/2010 | Welchko | H02P 5/74 318/400.26 |
| 2011/0074326 A1 | * | 3/2011 | Su | H02P 27/08 318/400.27 |

FOREIGN PATENT DOCUMENTS

EP  3 324 527  6/2021

* cited by examiner

*Primary Examiner* — Rina I Duda
(74) *Attorney, Agent, or Firm* — Warner Norcross + Judd LLP (57) ABSTRACT

A control system and method for an inverter that reduces capacitor current through a DC bus capacitor of the inverter. The control system and method may generate switching signals for a plurality of switching circuits in a manner that reduces capacitor current through the DC bus capacitor.

10 Claims, 6 Drawing Sheets

SYSTEM AND METHOD OF INVERTER CONTROL

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of inverters, and more particularly to the field of high-density inverters.

BACKGROUND

Market adoption of electric vehicles has increased rapidly in recent years. A principle aspect of an electric vehicle is a traction inverter configured to supply electrical power to a motor (e.g., an electric motor) of the vehicle. With rapid adoption in progress, conventional thinking is that traction inverters should increase the power density by more than eight times by 2025. Conventional efforts to meet this goal have focused on use of wide bandgap devices to improve the power density of the traction inverter (also described as a power module) and advancing thermal management to try to minimize the heatsink size.

In a conventional traction inverter, the DC bus capacitor accounts for a large portion of the utilized space. This DC bus capacitor cannot be reduced in size by using higher switching frequency because the DC bus capacitor and its size are mainly determined by the ripple current RMS value rather than the switching frequency. Use of a conventional dual inverter system with a segmented motor has allowed a reduction in the capacitor RMS ripple current by ~50% by interleaving the switching pulses. This conventional approach has allowed for a reduction in size of the DC bus capacitor. However, the reduction is considered insufficient relative to the power density goal outlined above.

SUMMARY

In general, one innovative aspect of the subject matter described herein is a high power-density inverter system. The high power-density inverter system may include a DC bus filter capacitor to be connected across terminals of a battery, and a dual 3-phase inverter to be connected across the terminals of the battery in parallel to the DC bus filter capacitor. The dual 3-phase inverter may include three H-bridges to be connected to respective three dual inductors of a three-phase electrical motor/generator, and driver circuitry configured to supply respective driving signals to the H-bridges to switch voltage of the battery according to a pulse width modulation (PWM) scheme to regulate the motor/generator currents, $i_a(t)$, $i_b(t)$, $i_c(t)$, and voltage. The dual 3-phase inverter may include a current sensor connected in series with the battery and configured to output a battery current signal, $i_{bat}(t)$, corresponding to a current through the battery;

The dual 3-phase inverter may include controller circuitry communicatively coupled with the current sensor and the driver circuitry.

The controller circuitry may be configured to receive $i_{bat}(t)$ from the current sensor, generate the driving signals based on a subset of the discrete number of instances of inverter DC-side current $i_{inv}(t)$ that satisfy $|i_{bat}(t)-i_{inv}(t)| < \epsilon \to 0$ wherein $i_{inv}(t)$ is a linear combination of $i_a(t)$, $i_b(t)$, $i_c(t)$ in accordance with $i_{inv}=(S_{a1}+S_{a2})\times i_a+(S_{b1}+S_{b2})\times i_b+(S_{c1}+S_{c2})\times i_c$, and direct the driver circuitry to supply the generated driving signals to the H-bridges of the dual 3-phase inverter.

The foregoing and other embodiments can each optionally include one or more of the following features, alone or in combination. In particular, one embodiment includes all the following features in combination.

In some embodiments, the subset of the discrete number of instances of $i_{inv}(t)$ may have three instances of $i_{inv}(t)$ that are closest to $i_{bat}(t)$.

In some embodiments, to generate the driving signals, the controller circuitry may be configured to: select the subset of the instances of $i_{inv}(t)$ from among the discrete number of instances of $i_{inv}(t)$, calculate conduction times corresponding to the instances of $i_{inv}(t)$ of the subset, and perform driving signal placement and planning.

In some embodiments, to generate the driving signals, the controller circuitry may be configured to compensate for deadtime for the placed and planned driving signals.

In some embodiments, to generate the driving signals, the controller circuitry may be configured to select optimal vectors to minimize DC ripple across the DC bus filter capacitor and to calculate switching timing for a target phase for the motor/generator voltage. The controller circuitry may be configured to determine if the switching timing is compatible with the optimal vectors, and if the switching timing is compatible with the optimal vectors, select the optimal vectors as selected vectors for the PWM scheme. The controller circuitry may be configured such that, if the switching timing is incompatible with the optimal vectors, the controller circuitry may determine and select sub-optimal vectors as the selected vectors for the PWM scheme. The controller circuitry may be configured direct the drive circuitry according the selected vectors for the PWM scheme.

In some embodiments, to select the subset of the instances of $i_{inv}(t)$ from among the discrete number of instances of $i_{inv}(t)$, the controller circuitry may be configured to operate the drive circuitry according to the selected subset of the instances.

In some embodiments, to calculate the conduction times, the controller circuitry may be configured to operate in accordance with the following:

$$\begin{bmatrix} t_0 \\ t_1 \\ t_2 \end{bmatrix} = \begin{bmatrix} A_0\cos(\theta_0) & A_1\cos(\theta_1) & A_2\cos(\theta_2) \\ A_0\sin(\theta_0) & A_1\sin(\theta_1) & A_2\sin(\theta_2) \\ 1 & 1 & 1 \end{bmatrix}^{-1} \times \begin{bmatrix} \frac{3}{2} \times M \times \cos(\alpha) \\ \frac{3}{2} \times M \times \sin(\alpha) \\ 1 \end{bmatrix}.$$

In some embodiments, to perform driving signal placement, the controller circuitry may be configured to determine a vector sequence of a discrete number of instances of vectors for the PWM scheme.

In some embodiments, the controller circuitry may be implemented on an integrated circuit (IC) chip.

In some embodiments, the IC chip may include one of a microcontroller, CMOS, or FPGA.

In general, one innovative aspect of the subject matter described herein is an inverter system for generating three-phase power from DC power received from a DC source. The inverter system may include power supply circuitry including a positive power input and a negative power input, where the positive power input and the negative power input may be operable to receive the DC power from the DC source. The power supply circuitry may include a positive output and a negative output operable to supply power received by the positive power input and the negative power input.

The inverter system may include a filter capacitor connected to the positive output and the negative output, where the filter capacitor may be operable to receive capacitor current via the positive output. The inverter system may include a sensor operably coupled to the positive output, where the sensor may be configured to sense a power supply current drawn to the positive output from the positive input.

The inverter system may include a switching system coupled to the filter capacitor and the positive output. The switching system may be operable to receive switching system current from at least one of the filter capacitor and the DC source via the positive output. The switching system may include first switching circuitry operably coupled to the positive output to draw first current from at least one of the filter capacitor and the DC source. The first switching circuitry may be configured to selectively supply first load current to a first load, and may be operable to selectively supply the first load current based on a first switching signal.

The switching system may include second switching circuitry operably coupled to the positive output to draw second current from at least one of the filter capacitor and the DC source. The second switching circuitry may be configured to selectively supply second load current to a second load, and may be operable to selectively supply the second load current based on a second switching signal.

The switching system may include third switching circuitry operably coupled to the positive output to draw third current from at least one of the filter capacitor and the DC source. The third switching circuitry may be configured to selectively supply third load current to a third load, and may be operable to selectively supply the third load current based on a third switching signal.

The switching system current may include the first, second, and third currents drawn respectively by the first, second, and third switching circuitry.

The inverter system may include a controller operably coupled to the switching system, where the controller may be configured to generate the first, second, and third switching signals based on a characteristic of power pertaining to the positive output of the power supply circuitry. The controller may be configured to generate the first, second, and third switching signals to reduce the capacitor current.

The foregoing and other embodiments can each optionally include one or more of the following features, alone or in combination. In particular, one embodiment includes all the following features in combination.

In some embodiments, the characteristic of power may be the power supply current drawn to the positive output from the positive power input, and where the controller may be configured to generate the first, second, and third switching signals based on sensor output from the sensor indicative of the power supply current.

In some embodiments, the inverter system may include driver circuitry operably coupled to the controller and the switching system. The driver circuitry may be configured to control the first, second, and third switching circuitry respectively based on the first, second, and third switching signals generated by the controller.

In some embodiments, the controller may be configured to generate the first, second, and third switching signals to reduce a difference between the power supply current and the switching system current.

In some embodiments, the controller may be configured to obtain instances of the switching system current from among a discrete number of instances of the switching system current, where the discrete number of instances include discrete instances of the first, second, and third current load currents.

In some embodiments, the controller may be configured such that the obtained instances of the switching system current correspond to a target phase output voltage and the switching system current that is closer to the power supply current than an alternative combination of the discrete number of instances of the switching system current.

In some embodiments, the obtained instances may be an optimal combination of the discrete number of instances for the target phase output voltage.

In some embodiments, the first, second, and third loads may correspond to first, second, and third inductive loads of an electric motor, and where the first, second, and third load currents are selectively supplied to the first, second, and third inductive loads to generate an electromotive force to rotate a rotor of the electric motor relative to a stator of the electric motor.

In general, one innovative aspect of the subject matter described herein is an inverter system for generating multi-phase power from DC power received from a DC source. The inverter system may include power supply circuitry including a positive power input and a negative power input, where the positive power input and the negative power input may be operable to receive the DC power from the DC source. The power supply circuitry may include a positive output and a negative output operable to supply power received by the positive power input and the negative power inputs.

The inverter system may include a filter capacitor connected to the positive output and the negative output. The filter capacitor may be operable to receive capacitor current via the positive output.

The inverter system may include a switching system coupled to the filter capacitor and the positive output, where the switching system may be operable to receive switching system current from at least one of the filter capacitor and the DC source via the positive output. The switching system may include a first output operable to selectively supply first load current to a first load based on a first switching signal. The switching system may include a second output operable to selectively supply second load current to a second load based on a second switching signal. The switching system current may include the first and second load currents supplied to the first and second loads.

The inverter system may include a controller operably coupled to the switching system, where the controller may be configured to obtain instances of the switching system current from among a discrete number of instances of the switching system current. The discrete number of instances may include discrete instances of the first and second load currents relative to a plurality of target phase voltages for the first and second loads, where the controller may be configured to generate the first and second switching signals based on the obtained instances of the switching system current.

The foregoing and other embodiments can each optionally include one or more of the following features, alone or in combination. In particular, one embodiment includes all the following features in combination.

In some embodiments, the inverter system may include a sensor operably coupled to the positive output, the sensor may be configured to sense a power supply current drawn to the positive output from the positive power input.

In some embodiments, the controller may be configured to obtain instances of the switching system current based on the power supply current sensed by the sensor.

In some embodiments, the controller may be configured to generate the first, second, and third switching signals based on sensor output from the sensor indicative of the power supply current.

In some embodiments, the switching system may include a third output operable to selectively supply third load current to a third load based on a third switching signal, where the discrete number of instances may include discrete instances of the first, second, and third load currents relative to a plurality of target phase voltages for the first, second, and third loads.

In some embodiments, the first and second loads may correspond to first and second inductive windings of an electric motor, and where the first and second load currents may be supplied to the first and second inductive windings to facilitate generation of electromotive force in the electric motor.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

The present disclosure is directed to a control system for an inverter that reduces capacitor current through a DC bus capacitor of the inverter. The control system may be operable to generate switching signals for a plurality of switching circuits in a manner that reduces capacitor current through the DC bus capacitor.

Among components of a traction inverter, the DC bus capacitor can be limiting in efforts to enhance power-density and increase reliability. Reductions in size of the DC bus capacitor can be constrained by RMS ripple current, which does not scale down with switching frequency. A segmented drive system with space-vector-modulation can reduce the ripple current by ~50%. One embodiment according to the present disclosure allows for a further reduction in ripple current, potentially minimizing the ripple current. In one embodiment, an optimal DC-ripple-energy adaptive-minimization (DREAM) modulation scheme or methodology can be implemented to achieve a 46% reduction over a segmented drive system, and at least a 66% reduction, potentially a 72% or greater reduction, over a non-segmented system.

Reduction of capacitor current through the DC bus capacitor not only can reduce the capacitor volume but also reduce the capacitor power loss and temperature, potentially enhancing reliability/lifetime. The control system described herein in accordance with one embodiment may not entirely rely on optimization of the phase shift between a pulse width modulation of the dual inverters, enabling the control system to reduce DC ripple current and increase power-density for a dual-inverter setup or a multi-inverter configuration.

I. Overview

Figure 1:
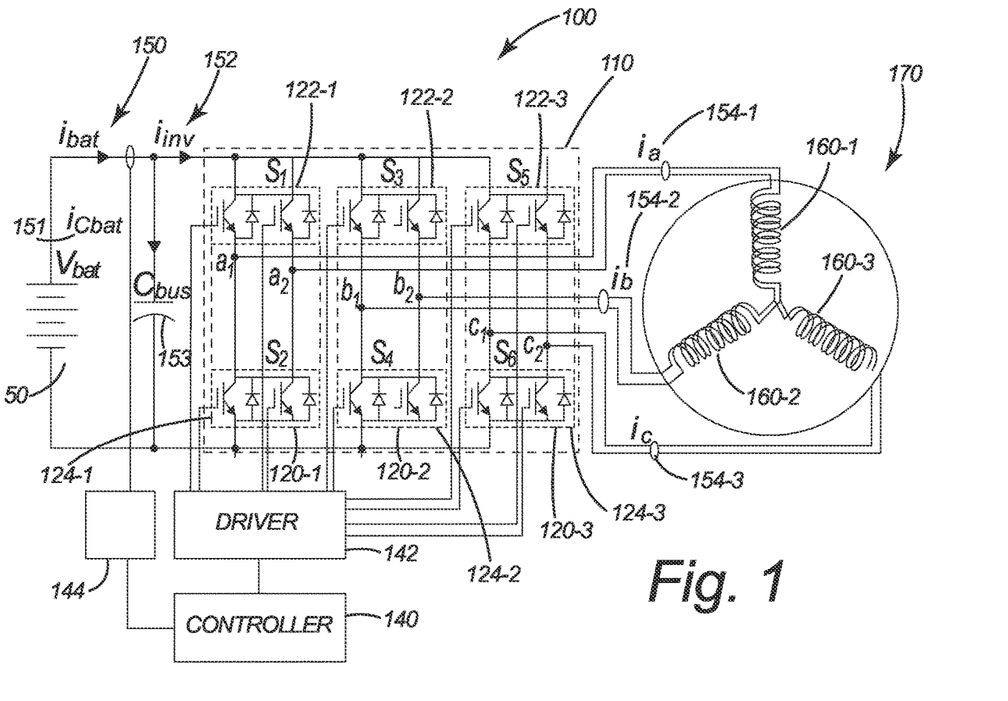
FIG. 1 shows a representative view of a system in accordance with one embodiment.

A power supply system is shown in accordance with one embodiment in FIG. 1, and generally designated 100. As discussed herein, the power supply system 100 may be configured differently than the configuration depicted in the illustrated embodiment. For instance, the power supply system 100 in the illustrated embodiment may be configured to three-phase operation. It is to be understood that the present disclosure is not so limited; the power supply system 100, for example, may be configured to multi-phase operation (e.g., two or more phase outputs).

The input voltage of the power supply system 100 may be provided in the form of a DC power source 50. The DC power source 50 may be any type of DC source, including a battery. As another example, the DC power source 50 includes power supply circuitry that generates a DC power output based on power received from an AC power source (e.g., grid power). The power supply circuitry may include rectification circuitry (passive or active) operable to translate AC power to DC power.

The DC power source 50 may be configured to provide power supply current 150 to at least one of a switching system 110 (e.g., switching circuitry) and a DC bus capacitor 153, which is also described herein as a filter capacitor. Current to the DC bus capacitor 153 is designated as capacitor current 151 in the illustrated embodiment, and current to the switching system 110 is designated as switching system current 152 in the illustrated embodiment.

The ripple in the capacitor current 151 may be reduced by increasing the capacitance of the DC bus capacitor 153 but at a cost of increased volume, weight, and expense. A switching methodology in accordance with one embodiment of the present disclosure may enable reduction of the DC bus capacitor 153, enabling a more compact system or increased power density.

A power supply system 100 in accordance with one embodiment may implement a control methodology for the switching system 110 that significantly reduces the capacitor current 151, potentially minimizing the capacitor current 151, to enable a significant decrease in capacitance of the DC bus capacitor 153. As a result, the control methodology in accordance with one embodiment may significantly increase the power density of the power supply system 100 over conventional systems.

The power supply system 100 in the illustrated embodiment of FIG. 1 includes an electric motor 170 and a switching system 110 configured to transmit power to the electric motor 170. For purposes of disclosure, the electric motor 170 is described herein as an electric motor that is part of a vehicle; however, the electric motor 170 or one or more components may be any type of electrical load, including a wireless power transmitter, and may be incorporated into any type of apparatus or device, including, for instance, a mobile phone or table top appliance.

Additional examples of applications include a traction motor drive for transportation applications; industrial motor drive; renewable energy system with 3-phase inverters including solar, wind, etc.; and grid application with 3-phase inverters.

The electric motor 170 in the illustrated embodiment includes a plurality of loads 160-1, 160-2, 160-3. The plurality of loads 160-1, 160-2, 160-3 may correspond to inductive coils of the electric motor 170 to facilitate generation of electromotive force and torque. As described herein, the number and type of the loads 160-1, 160-2, 160-3 may vary depending on the application. For instance, the type may correspond to a wireless power transmitter instead of an inductive coil for generating electromotive force in an electric motor 170.

In the illustrated embodiment, each of the plurality of loads 160-1, 160-2, 160-3 is respectively supplied load current 154-1, 154-2, 154-3 by the switching system 110. The load current 154-1, 154-2, 154-3 may be selectively supplied in a manner that generates electromotive force in the electric motor 170 and avoids significant capacitor current 151.

The power supply system 100 in the illustrated embodiment includes a controller 140 operably coupled to driver circuitry 142 and a sensor 144. The sensor 144 may be configured to detect one or more characteristics of power with respect to power in the power supply system 100. For instance, the sensor 144 may be configured to generate one or more sensor outputs respectively indicative of one or more of the power supply current 150, the capacitor current 151, and the switching system current 152. The one or more sensor outputs of the sensor 144 may be obtained by the controller 140, which may control operation of the switching system 110 based on the one or more sensor outputs. The sensor 144 is shown separate from the controller 140, but may be integral therewith in one embodiment.

The driver circuitry 142 may be pass through conductors that provide a direct connection between the switching system 110 and the controller 140. Alternatively, the driver circuitry 142 may include a multiplexor or signal conditioning circuitry, or both, to translate output from the controller 140 to direct operation of the switching system 110.

The switching system 110 in the illustrated embodiment includes first, second, and third H-bridge inverter configurations 120-1, 120-2, 120-3 (e.g., three full bridge inverter circuits). Each H-bridge inverter configuration 120-1, 120-2, 120-3 may include high side switching circuitry 122-1, 122-2, 122-3 and low side switching circuitry 124-1, 124-2, 124-3. The high side switching circuitry 122-1, 122-2, 122-3 for each of the H-bridge inverter configurations 120-1, 120-2, 120-3 include first and third switches, with the first switch coupled to a first output a1, b1, c1, and the third switch coupled to a second output a2, b2, c2 of the respective H-bridge inverter configuration 120-1, 120-2, 120-3. The low side switching circuitry 124-1, 124-2, 124-3 for each of the H-bridge inverter configurations 120-1, 120-2, 120-3 may include second and fourth switches, with the second switch coupled to the first output a1, b1, c1, and the fourth switch coupled to the second output a2, b2, c2 of the respective H-bridge inverter configuration 120-1, 120-2, 120-3. The first, second, third, and fourth switches may be capable of operating in conjunction with each other to provide input power to a load 160-1, 160-2, 160-3 respectively coupled to the H-bridge inverter configuration 120-1, 120-2, 120-3.

Alternatively, the H-bridge inverter configuration 120-1, 120-2, 120-3 may be provided in a half bridge configuration with first and second switches operable to provide power to a respective load 160-1, 160-2, 160-3. The driver circuitry 142 in this alternative embodiment may be different from the driver circuitry 142 in order to selectively activate the first and second switches instead of four switches. The first and second switches may be similar in construction to the switches depicted in the illustrated embodiment of FIG. 1, which may be a WBG switch or any other type of switch capable of selectively supplying power to the load 160-1, 160-2, 160-3.

The controller 140 may be coupled to one or more components of the power supply system 100 to achieve operation in accordance with the described functionality and methodology.

The controller 140 may include any and all electrical circuitry and components to carry out the functions and algorithms described herein. Generally speaking, the controller 140 may include one or more microcontrollers, microprocessors, and/or other programmable electronics that are programmed to carry out the functions described herein. The controller 140 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the power supply system 100, or they may reside in a common location within the power supply system 100. When physically distributed, the components may communicate using any suitable serial or parallel communication protocol, such as, but not limited to, CAN, LIN, FireWire, I2C, RS-232, RS-485, and Universal Serial Bus (USB).

II. Control Methodology

In the illustrated embodiment of FIG. 1, the power supply system 100 may be configured to receive power from a DC power source 50 (e.g., a battery). The control methodology described herein may utilize space vector selection, switching time calculation, and switching pulse placement and planning. Optionally, the control methodology may utilize deadtime compensation.

In the illustrated embodiment of FIG. 1, the power supply system 100 includes a switching system 110 configured as a dual 3-phase inverter, including six power semiconductor switches each and the filter capacitor 153 (e.g., a DC bus filter capacitor). The switching system 110 may switch the voltage from the DC power source 50 (e.g., the battery voltage) according to a pulse width modulation (PWM) scheme to regulate the motor current ($i_x$, x=a, b, c) and voltage. In conducting the switching operations, the power supply system 100 may generate ripple currents in the DC link to the DC power source 50. The filter capacitor 153 may be provided to reduce these ripple currents in order to absorb the ripple currents, so that a relatively constant current flows into the DC power source 50. In one switching period, the motor currents are considered relatively constant, so the switching system current 152 (e.g., inverter DC side current $i_{inv}$) can be determined as the sum of the three top switch currents, determined by:

$$i_{inv}=(S_{a1}+S_{a2})i_a+(S_{b1}+S_{b2})i_b+(S_{c1}+S_{c2})i_c \quad (1),$$

where $S_{x1}$, $S_{x2}$ (x=a,b,c), respectively, represents the dual inverters' switching functions of the phase leg x and only have values of 1 and 0, depending on whether the top or low side switch is in an ON state. For example, $i_{inv}$, equals −2ic when S1=S2={1,1,0} and switch to ia−ic when S1 stays as {1,1,0} and S2 flips to {1,0,0} within a switching period due to modulation. Therefore, $i_{inv}$ switches between two current values at switching frequency, which creates current ripple flowing to the filter capacitor 153.

In the illustrated embodiment, $i_{inv}$ has 19 possible values depending on the switching function combinations. Some combinations may be more useful than others for supplying power to the electric motor 170. A subset of these combinations is depicted in the illustrated embodiment of FIG. 2. It is noted that capacitor current 151 ($i_{Cbus}$) is 0 if $i_{inv}=i_{bat}$. In practice, because $i_{inv}$ has 19 possible discrete values, $i_{inv}=i_{bat}$ cannot be guaranteed at all times; however, the controller 140 may select the values of $i_{inv}$ closest to $i_{bat}$ in an effort to reduce, potentially minimize, capacitor current 151 or ripple.

Use of dual inverters in one embodiment may enable reduction of the DC ripple current in cases where control of the dual inverters is conducted according to one embodiment. Space vector selection, placement, sequence, and conduction time, or a subset thereof, may be controlled to reduce the DC ripple current in the filter capacitor 153. Additionally, or alternative to these control parameters, phase shift of the dual inverter configuration may be controlled to reduce DC ripple current. It is noted that a peak value of capacitor current 151 may determine the current rating for the filter capacitor 153. Alternating zero vector SVM can reduce the ripple current some but less than a reduction achieved in accordance with one or more control methodologies described herein. For instance, a segmented configuration of a dual-inverter motor drive may be controlled such that the switching ripple energy in the filter capacitor 153 is reduced relative to alternating zero vector SVM operation and optionally minimized. Reduction of the capacitor current 151 can reduce filter capacitor power loss (e.g., DC link capacitor power loss) and potentially volume of the filter capacitor 153.

Figure 2:
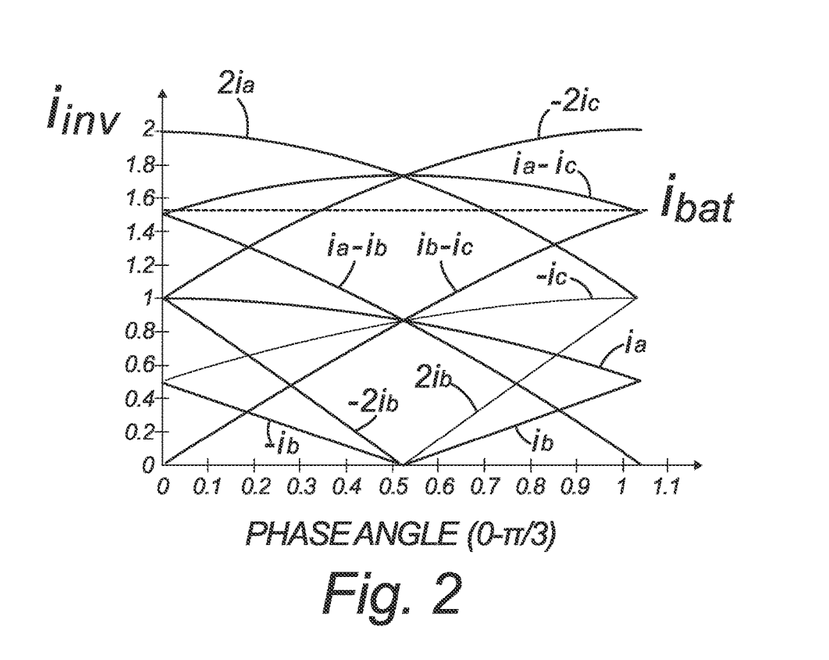
FIG. 2 shows potential vectors in accordance with one embodiment.

FIG. 2 as noted herein, depicts a subset of available combinations of the switching system 110. Specifically, the illustrated embodiment of FIG. 2 shows all of the 11 positive $i_{inv}$ current values that can be selected within a phase angle ranging from 0 to π/3. Depending on the amplitude of $i_{bat}$ and the phase angle, certain current values are closer to $i_{bat}$. For example, at phase=0, the closest current values to the shown $i_{bat}$ are 2ia, ia−ic, and ia−ib. The switching functions corresponding to those current values can be determined according to the space vector representation, as depicted in the illustrated embodiment of FIG. 3.

In one embodiment, $i_{inv}$ has 19 possible values, depending on vector selection (e.g., −ia, ib, ic, ia−ic . . . ). At each time instance, 9 positive, 9 negative, and 1 zero value are available for selection. Some values may be closer to $i_{bat}$ than others (e.g., the 9 negative values may not be used over the other potential selections). The controller 140 may select the closest 3 vectors to synthesize a target phase output voltage $V_{ref}$.

Figure 3:
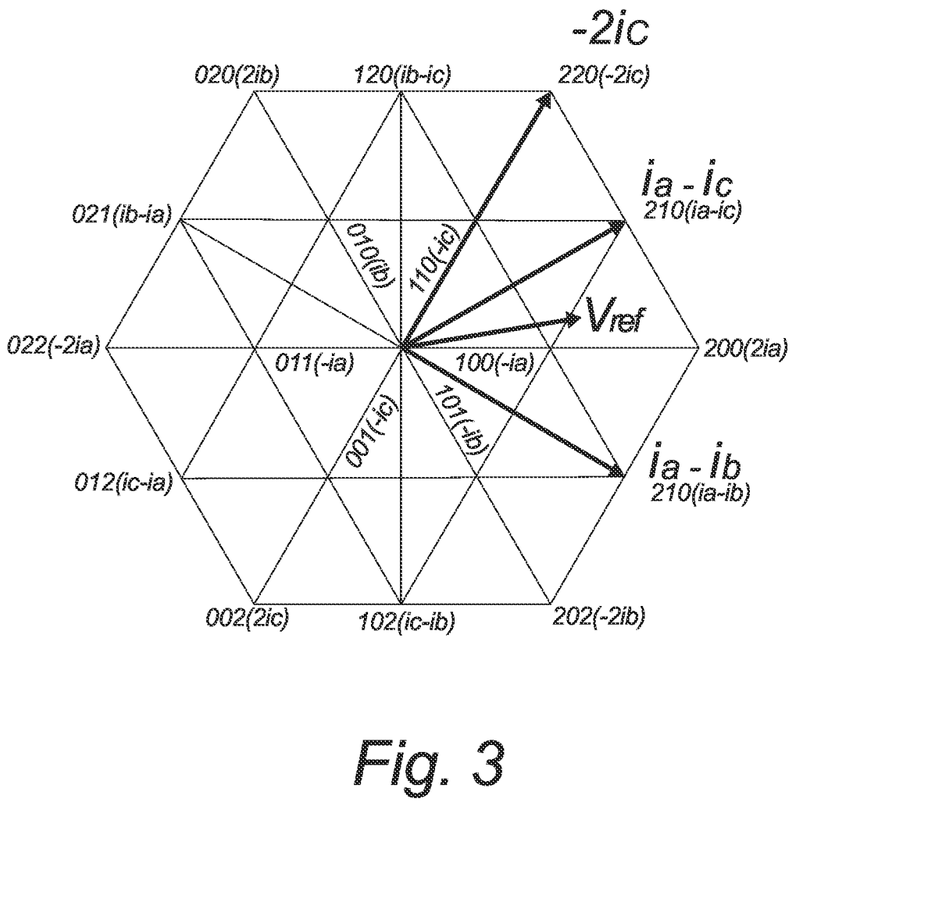
FIG. 3 shows another view of potential vectors in accordance with one embodiment.

The controller 140 in accordance with one embodiment may be configured to control the switching system 110 in accordance with space vector modulation (SVM). SVM may provide a high degree of design freedom in terms of pulse positioning and sequencing. FIG. 3 synthesizes the possible vectors under a dual-inverter setup and shows the resultant DC side current values ($i_{inv}$). Compared to a single inverter setup, the dual inverter SVM configuration introduces additional 6 long vectors and 6 medium vectors besides the existing 6 short vectors. The total 18 non-zero vectors triples the possible current values of $i_{inv}$, which can be synthesized closer to the battery current $i_{bat}$. Accordingly, a dual-inverter setup can achieve lower capacitor ripple by use of a switching arrangement in accordance with one or more embodiments described herein.

Figure 4:
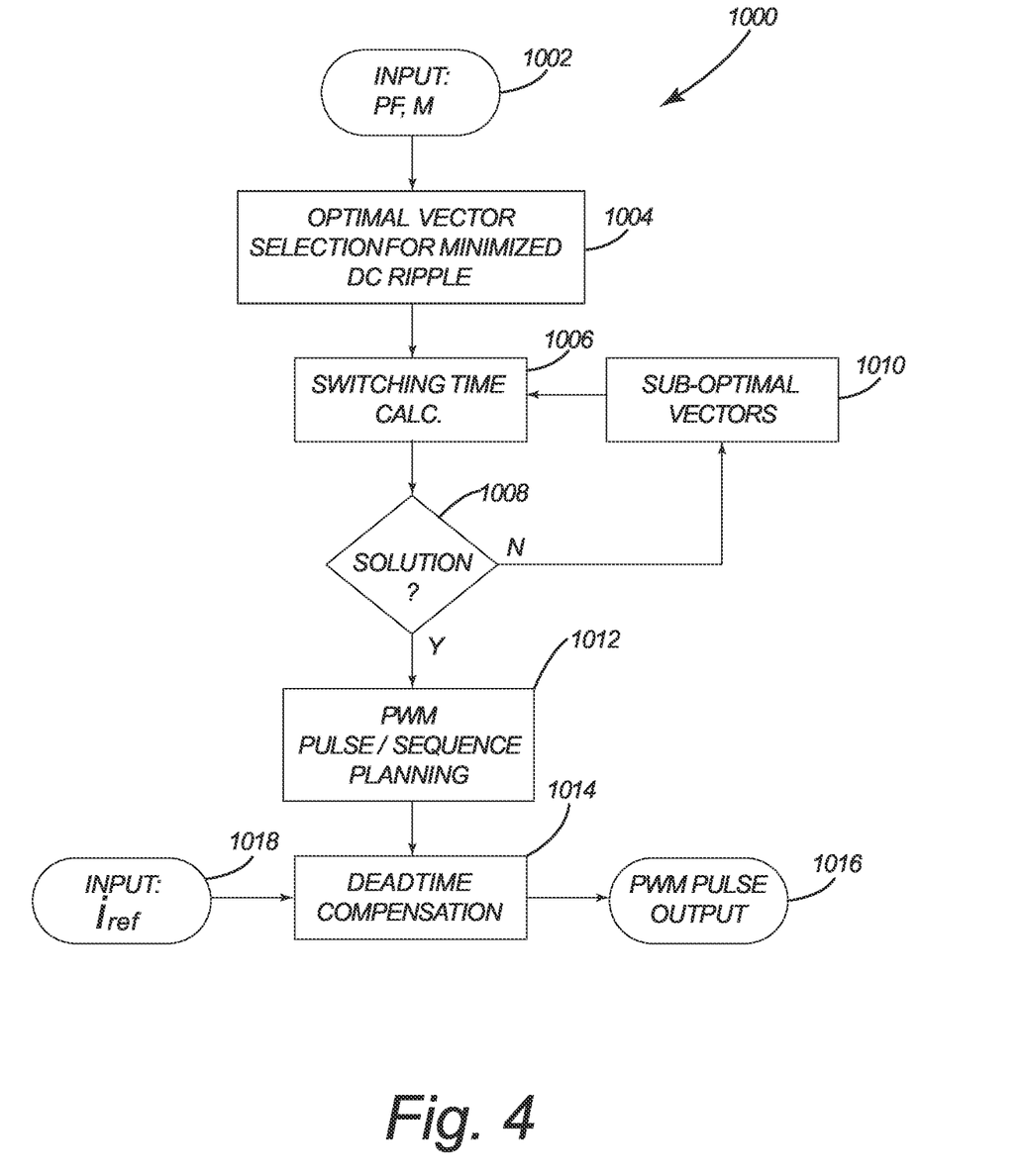
FIG. 4 shows a method of operation accordance with one embodiment.

Turning to the illustrated embodiment of FIG. 4, a method of controlling operation of the switching system 110 is shown and generally designated 1000. The method 1000 depicts a modulation scheme for a dual-inverter setup. Starting with a power factor and modulation index, a targeted $i_{bat}$ can be determined. Step 1002. The three vectors that lead current values closest to $i_{bat}$ can be selected. Step 1004. For instance, the equation below may be solved for the conduction time of the three selected vectors. It is noted that some vector combinations may not have solutions. If an optimal set of selected vectors does not provide a solution, the system may roll back to a sub-optimal set of vectors and re-calculate the conduction time of the three selected vectors.

Although the selection in the illustrated embodiment is optimal—it is to be understood that the method 1000 may not include selecting a set of vectors that yield an optimal result for minimal $i_{bat}$; instead the method 1000 may include selecting a set of vectors that reduce $i_{bat}$ (potentially in a non-minimal manner) while complying with one or more other criteria.

In an alternative embodiment, the method 1000 can be performed based on "current vector projection." "Current vector projection" may provide an analytical solution to find the three vectors that are closest to $i_{bat}$ (Step 1004 in FIG. 4). In this solution, each (current) vector is geometrically projected to the targeted output current vector $I_{ref}$. Those current vectors are sorted according to the closeness between the projection length and the $i_{bat}$ value. The closest three vectors may be selected as the optimal vector set.

The three vectors, optionally optimal vectors, that are determined according to the method 1000 may be used to synthesize a target reference inverter-output voltage, which is identified as Vref in FIG. 3. This target voltage Vref is determined by the control command to drive the motor in order to achieve certain torque and speed. The time duration of each vector may be calculated by:

$$\begin{bmatrix} t_0 \\ t_1 \\ t_2 \end{bmatrix} = \begin{bmatrix} A_0\cos(\theta_0) & A_1\cos(\theta_1) & A_2\cos(\theta_2) \\ A_0\sin(\theta_0) & A_1\sin(\theta_1) & A_2\sin(\theta_2) \\ 1 & 1 & 1 \end{bmatrix}^{-1} \cdot \begin{bmatrix} \frac{3}{2} \cdot M \cdot \cos(\alpha) \\ \frac{3}{2} \cdot M \cdot \sin(\alpha) \\ 1 \end{bmatrix}$$

$$t_0, t_1, t_2 \in [0, 1]$$

The three vectors selected according to the method 1000 may not be independent of each other. Accordingly, the disclosed method may not be able to synthesize a specific Vref, for which a sub-optimal solution is selected. The loop may continue until the Vref synthesizing algorithm can result in a fixed solution. Steps 1006, 1008, 1010. The selected vectors can then be fed into a PWM pulse/sequence planning procedure to avoid multiple turn-on/off of one phase-leg within one switching period. Step 1012.

In one embodiment, reduction of switching loss is considered, and deadtime compensation may be used to enhance the performance (e.g., to reduce switching loss). Steps 1014, 1018, 1016.

With the above SVM implementation of the method 1000, the switching pulses of the two inverters can be generated synthetically. Conventional schemes, instead, individually modulate the PWMs of each inverter and apply a phase shift in between, and therefore do not fully harvest the benefit of a dual-inverter setup. The method 1000 and associated switching scheme can be referred to as DC-Ripple-Energy Adaptive-Minimization (DREAM) modulation, and enable significant reduction in capacitor current 151 relative to conventional schemes.

Figure 5:
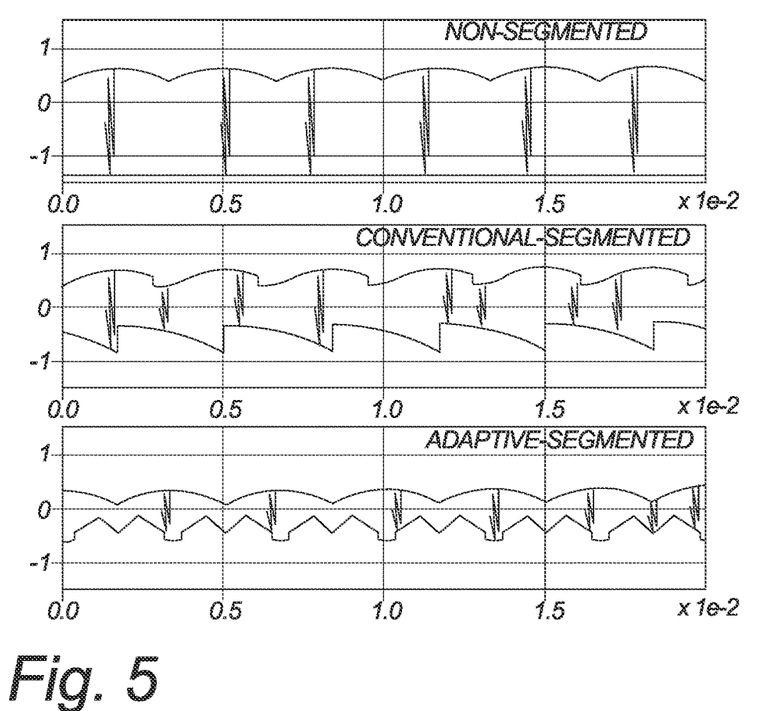
FIG. 5 shows a normalized view of capacitor current according to various modes of operation.
Figure 6:
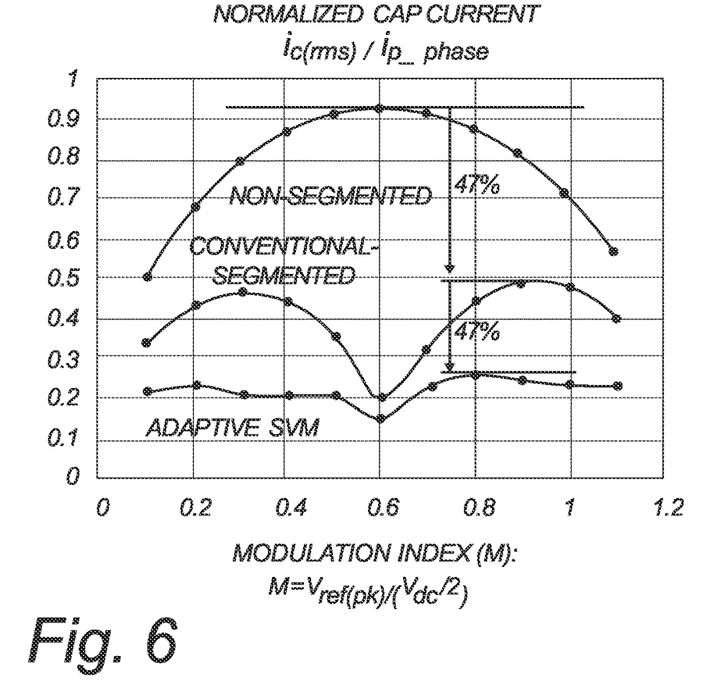
FIG. 6 shows another view of normalized passenger current according to various modes of operation.

In the illustrated embodiment of FIG. 5, simulated, normalized capacitor ripple current waveforms with modulation index M=0.9 and power factor (PF)=1 are shown for non-segmented and conventional segmented modes of operation along with an adaptive segmented mode of operation according to one embodiment. In other words, the adaptive segmented dual-inverter scheme (e.g., the DREAM segmented scheme) is compared to a non-segmented single-inverter scheme and a conventional segmented dual-inverter scheme. Both non-segmented and conventional segmented schemes use alternating-zero-vector SVM. The two inverters for the conventional segmented scheme use 180 degree phase shift between the two inverters. The ripple reduction of the adaptive segmented mode of one embodiment can be seen. Normalized current in the three cases are measured as 0.81, 0.48 and 0.26, respectively. Modulation index (M) is swept for all three schemes and the normalized capacitor currents are shown in FIG. 6. If the capacitor current rating is selected for a worst case scenario, then the adaptive SVM scheme of one embodiment (e.g., DREAM SVM scheme) achieves an additional 46% reduction on top of the 47% of reduction from switching from non-segmented to a conventional segmented drive scheme.

Figure 7:
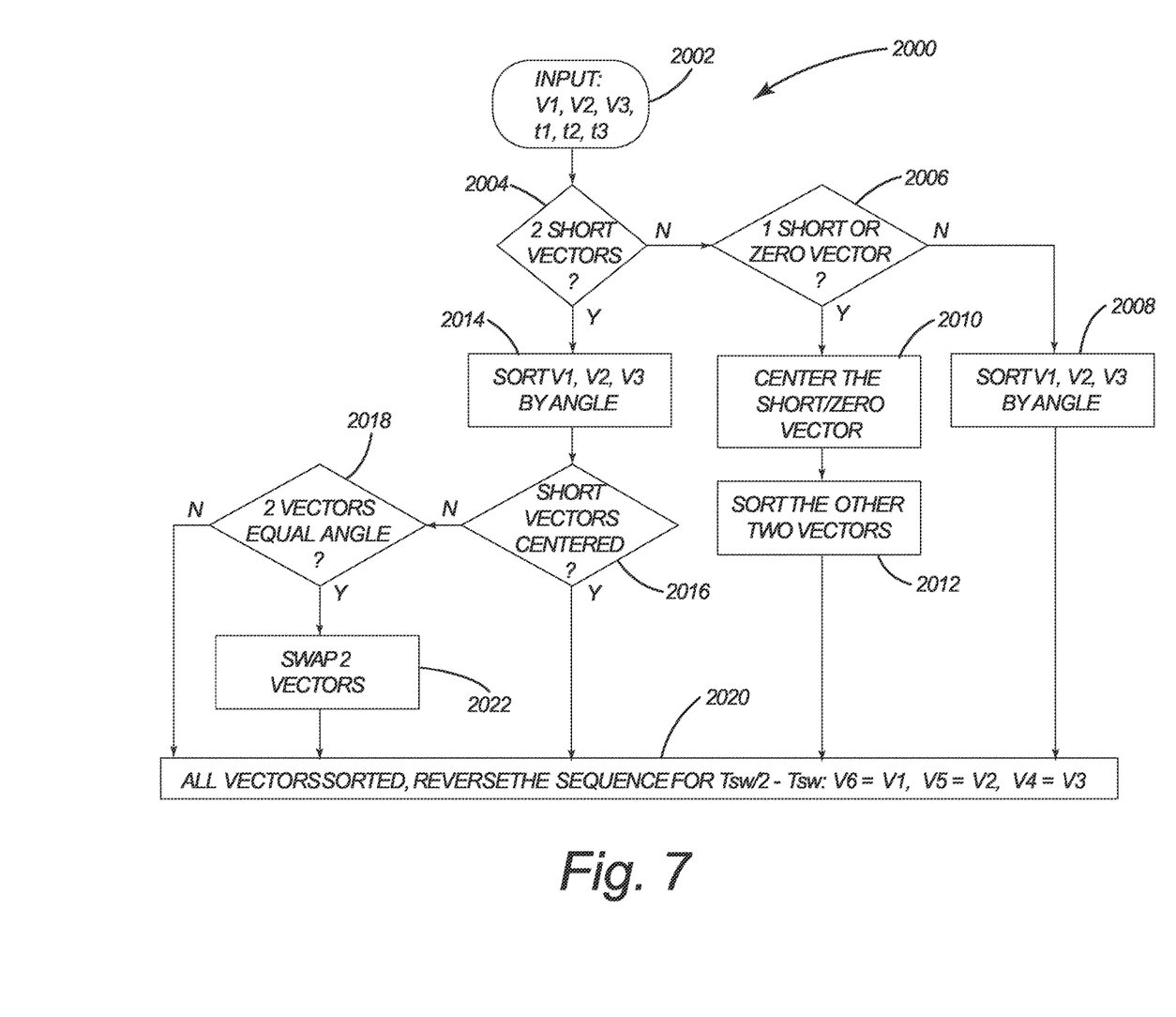
FIG. 7 shows a method of operation accordance with one embodiment.

In the illustrated embodiment of FIG. 7, a method of controlling operation of the switching system 110 is shown and generally designated 2000. The method may be incorporated into the vector selection and placement steps of the method 1000, such as step 1012 of the method 1000.

The method 2000 may involve selecting vector placement for operation of the switching system 110. Input vectors and times may be provided as input. Step 2002. Two short vector combinations, single short vector combinations, and no short vector combinations may be separated. Steps 2004, 2006. For two short vector combinations, the vectors may be sorted by angle, and further separated based on placement of the short vector and vector length. Steps 2016, 2018. If two vectors are equal in angle, the two vectors may be swapped. Step 2022.

For single short vector combinations, the short or zero vector may be centered, and the other two vectors may be sorted based on angle. Steps 2010, 2012.

For no short vector combinations, the vectors may be sorted by angle. Step 2008.

All of the vectors from the separation and sorting steps may be sorted, and the sequence may be reversed for Tsw/2–Tsw: V6=V1, V5=V2, V4=V3. This method 2000 of sorting and analysis of the vectors may enable selection of three working vectors to avoid double switching.

Figure 8:
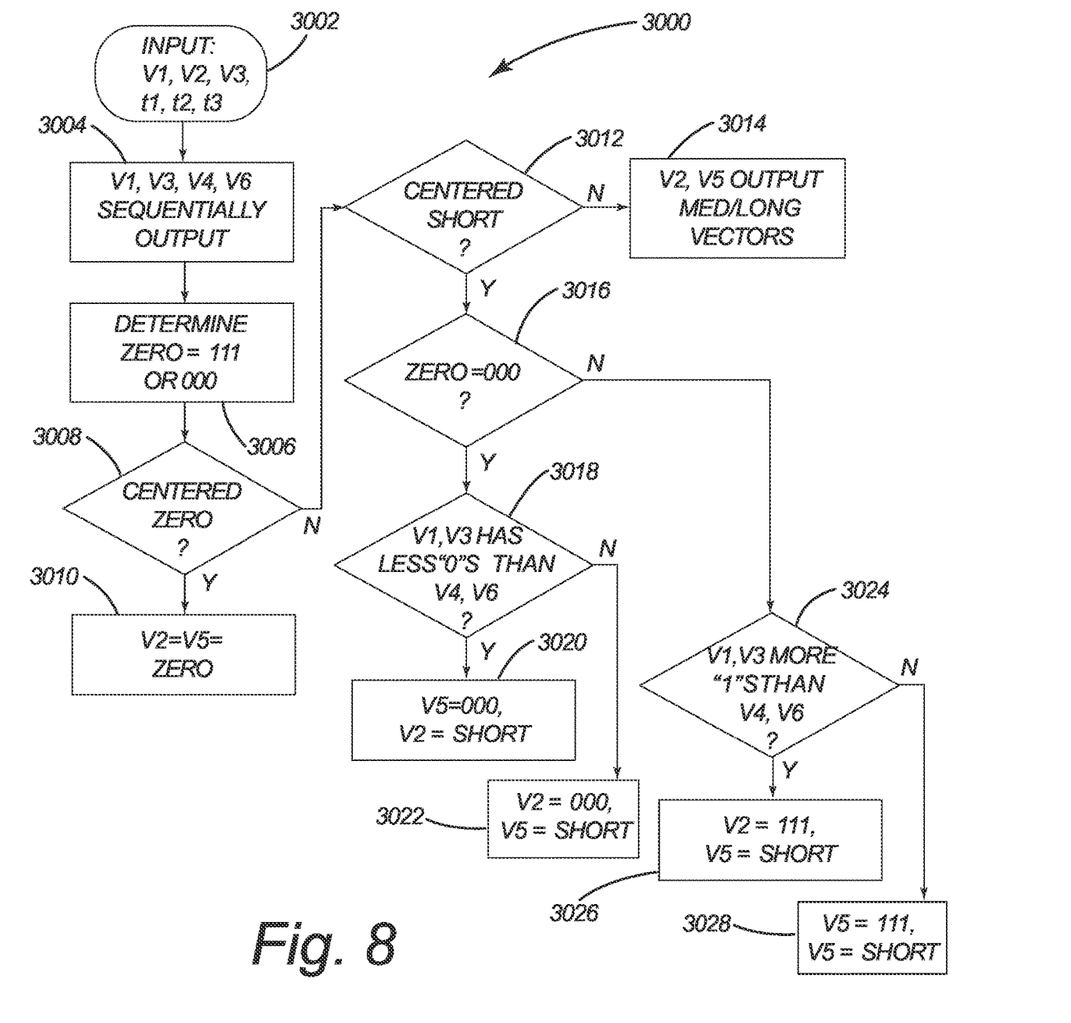
FIG. 8 shows a method of operation in accordance with one embodiment.

In the illustrated embodiment of FIG. 8, a method of controlling operation of the switching system 110 is shown and generally designated 3000. The method may be incorporated into the vector sequence planning steps of the method 1000, such as step 1012 of the method 1000.

The method 3000, for example, may be utilized to determine placement of selected vectors. The method may involve switching sequence planning, and receive vectors V1-V6 as input from the output of the method 2000. The vectors may be sequentially output V1, V3, V4, V6. Step 3004. The method may involve determining ZERO vector combinations (000 or 111), and determining if the vector combination is a centered zero arrangement. Steps 3006, 3008.

If the vector combination is a centered zero arrangement, V2 is equal to V5 and ZERO. If the vector combination is not a centered zero arrangement, the method 3000 may involve determining if the vector combination is a centered short combination. Steps 3010, 3012. If the vector combination is not a centered short combination, V2 and V5 are output as medium/long vectors. Step 3014. If the vector combination is a centered short combination, and ZERO=000 is not satisfied, the method may involve determining if V1, V3 include more "1"s than V4, V6. Steps 3016, 3024. If V1, V3 include more "1"s than V4, V6, then V2=111 and V5 is a short. Step 3026. If V1, V3 do not include more "1"s than V4, V6, V5=111 and V2 is a short. Step 3028.

In the illustrated embodiment, at steps 3016, 3018, 3022, if ZERO=000 and V1, V3 does not have less "0"s than V4, V6, then V2=000 and V5 is a short. If ZERO=000 and V1, V3 does have less "0"s than V4, V6, then V5=000 and V2 is a short.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A high power-density inverter system, the high power-density inverter system comprising:
   a DC bus filter capacitor to be connected across terminals of a battery;
   a dual 3-phase inverter to be connected across the terminals of the battery in parallel to the DC bus filter capacitor, wherein the dual 3-phase inverter comprises:
   three H-bridges to be connected to respective three dual inductors of a three-phase electrical motor/generator, and
   driver circuitry configured to supply respective driving signals to the H-bridges to switch voltage of the battery according to a pulse width modulation (PWM) scheme to regulate the motor/generator currents, $i_a(t)$, $i_b(t)$, $i_c(t)$, and voltage;
   a current sensor connected in series with the battery and configured to output a battery-current signal, $i_{bat}(t)$ corresponding to a current through the battery; and
   controller circuitry communicatively coupled with the current sensor and the driver circuitry, the controller circuitry configured to:
   receive $i_{bat}(t)$ from the current sensor,
   generate the driving signals based on a subset of a discrete number of instances of inverter DC-side current $i_{inv}(t)$ that satisfy $|i_{bat}(t)-i_{inv}(t)|<\epsilon \to 0$ wherein $i_{inv}(t)$ is a linear combination of the motor/generator currents, $i_a(t)$, $i_b(t)$, $i_c(t)$ in accordance with $i_{inv}=(S_{a1}+S_{a2})\times i_a+(S_{b1}+S_{b2})\times i_b+(S_{c1}+S_{c2})\times i_c$, wherein $S_{a1}$, $S_{a2}$, $S_{b1}$, $S_{b2}$, $S_{c1}$, and $S_{c2}$, respectively represent the switching states of the three H-bridges, and
   direct the driver circuity to supply the generated driving signals to the H-bridges of the dual 3-phase inverter.

2. The high power-density inverter system of claim 1, wherein the subset of the discrete number of instances of $i_{inv}(t)$ has three instances of $i_{inv}(t)$ that are closest to $i_{bat}(t)$.

3. The high power-density inverter system of claim 1, wherein, to generate the driving signals, the controller circuitry is configured to:
   select the subset of the instances of $i_{inv}(t)$ from among the discrete number of instances of $i_{inv}(t)$,
   calculate conduction times corresponding to the instances of $i_{inv}(t)$ of the subset, and
   perform driving signal placement and planning.

4. The high power-density inverter system of claim 3, wherein, to generate the driving signals, the controller circuitry is configured to compensate for deadtime for the placed and planned driving signals.

5. The high power-density inverter system of claim 1, wherein, to generate the driving signals, the controller circuitry is configured to:
   select optimal vectors to minimize DC ripple across the DC bus filter capacitor;
   calculate switching timing for a target phase for the motor/generator voltage;
   determine if the switching timing is compatible with the optimal vectors;
   if the switching timing is compatible with the optimal vectors, select the optimal vectors as selected vectors for the PWM scheme;
   if the switching timing is incompatible with the optimal vectors, determine and select sub-optimal vectors as the selected vectors for the PWM scheme; and
   configure drive circuitry according the selected vectors for the PWM scheme.

6. The high power-density inverter system of claim 1, wherein to select the subset of the instances of (t) from among the discrete number of instances of $i_{inv}(t)$, the controller circuitry is configured to operate the drive circuitry according to the selected subset of the instances.

7. The high power-density inverter system of claim 3, wherein, to calculate the conduction times, the controller circuitry is configured to operate in accordance with the following:

$$\begin{bmatrix} t_0 \\ t_1 \\ t_2 \end{bmatrix} = \begin{bmatrix} A_0\cos(\theta_0) & A_1\cos(\theta_1) & A_2\cos(\theta_2) \\ A_0\sin(\theta_0) & A_1\sin(\theta_1) & A_2\sin(\theta_2) \\ 1 & 1 & 1 \end{bmatrix}^{-1} \times \begin{bmatrix} \frac{3}{2}\times M \times \cos(\alpha) \\ \frac{3}{2}\times M \times \sin(\alpha) \\ 1 \end{bmatrix},$$

wherein M is the modulation index, $\theta_0$, $\theta_1$, and $\theta_2$ are the phase angles during the respective time periods $t_0$, $t_1$, $t_2$, $A_0$, $A_1$, and $A_2$ are the amplitudes during the respective time periods $t_0$, $t_1$, $t_2$, and $\alpha$ is the power factor.

8. The high power-density inverter system of claim 3 wherein, to perform driving signal placement, the controller circuitry is configured to determine a vector sequence of a discrete number of instances of vectors for the PWM scheme.

9. The high power-density inverter system of claim 1, wherein the controller circuitry is implemented on an integrated circuit (IC) chip.

10. The high power-density inverter system of claim 9, wherein the IC chip comprises one of a microcontroller, CMOS, or FPGA.

* * * * *